US012135114B2

(12) United States Patent
Ito

(10) Patent No.: US 12,135,114 B2

(45) Date of Patent: Nov. 5, 2024

(54) LIGHTING DEVICE, MOUNTING DEVICE, AND IMAGE FORMING DEVICE

(71) Applicant: FUJIFILM CORPORATION, Tokyo (JP)

(72) Inventor: Makoto Ito, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/548,562

(22) PCT Filed: Mar. 31, 2022

(86) PCT No.: PCT/JP2022/016924

§ 371 (c)(1), (2) Date: Aug. 31, 2023

(87) PCT Pub. No.: WO2022/211110

PCT Pub. Date: Oct. 6, 2022

(65) Prior Publication Data

US 2024/0151372 A1 May 9, 2024

(30) Foreign Application Priority Data

Mar. 31, 2021 (JP) ................................ 2021-060620

(51) Int. Cl.

*F21K 9/68* (2016.01)
*F21V 7/00* (2006.01)

(Continued)

(52) U.S. Cl.

CPC .............. *F21K 9/68* (2016.08); *F21V 7/0033* (2013.01); *F21V 7/09* (2013.01); *F21Y 2115/10* (2016.08)

(58) Field of Classification Search

CPC . F21K 9/68; F21V 7/0033; F21V 7/09; F21Y 2115/10

See application file for complete search history.

(56) References Cited

U.S. PATENT DOCUMENTS

| | | | |
|---|---|---|---|
| 8,783,924 | B1 | 7/2014 | Zuiderveen |
| 2015/0003095 | A1 | 1/2015 | Gebauer |

(Continued)

FOREIGN PATENT DOCUMENTS

| | | |
|---|---|---|
| JP | H8-339107 A | 12/1996 |
| JP | 2001-093312 A | 4/2001 |

(Continued)

OTHER PUBLICATIONS

English language translation of the following: Office action dated Jul. 30, 2024 from the JPO in a Japanese patent application No. 2021-060620 corresponding to the instant patent application. This office action translation is submitted now in order to supplement the understanding of the cited references which are being disclosed in the instant Information Disclosure Statement.

*Primary Examiner* — Elmito Breval

(74) *Attorney, Agent, or Firm* — SOLARIS Intellectual Property Group, PLLC

(57) ABSTRACT

A lighting device includes: a light source that is disposed on one surface; a first reflective portion that reflects light from the light source toward a first direction that is one direction along the one surface and a second direction that is along the one surface and crosses the first direction; and a second reflective portion that is disposed on a side of the first reflective portion in the second direction and reflects light from the first reflective portion toward the first direction.

4 Claims, 14 Drawing Sheets

(51) Int. Cl.
*F21V 7/09* (2006.01)
*F21Y 115/10* (2016.01)

(56) References Cited

U.S. PATENT DOCUMENTS

2019/0294098 A1 9/2019 Funakawa
2021/0112647 A1 * 4/2021 Coleman ................ H05B 47/16

FOREIGN PATENT DOCUMENTS

JP 2008-216540 A 9/2008
JP 2019-168577 A 10/2019

* cited by examiner

LIGHTING DEVICE, MOUNTING DEVICE, AND IMAGE FORMING DEVICE

TECHNICAL FIELD

The technology of the present disclosure relates to a lighting device, a mounting device, and an image forming device.

BACKGROUND ART

Japanese Patent Application Laid-Open (JP-A) No. 2008-216540 discloses a light direction changing element including: a columnar body having translucency; a recess provided in one surface of the columnar body in such a way as to be able to accommodate a light source without being in contact with the light source; a funnel-shaped reflective surface provided on the other surface of the columnar body and having a funnel shape that disperses incident light from the recess; an inclined reflective surface provided at a peripheral edge portion of the funnel-shaped reflective surface and reflecting or transmitting reflected light from the funnel-shaped reflective surface; and a flat reflective surface provided on the one surface of the columnar body excluding the recess and reflecting reflected light from the funnel-shaped reflective surface and the inclined reflective surface.

SUMMARY OF INVENTION

Technical Problem

As a lighting device, a lighting device including a light source that is disposed on one surface, and a reflective portion that reflects light from the light source in a first direction that is one direction along the one surface and a second direction that is along the one surface and orthogonal to the first direction is conceivable. Since the lighting device includes only one reflective portion, it is difficult to lengthen, in the second direction, a region illuminated with the light directed in the first direction.

One embodiment according to a technology of the present disclosure provides a lighting device, a mounting device, and an image forming device capable of lengthening, in the second direction, a region illuminated with light directed in the first direction as compared with the configuration including only one reflective portion.

Solution to Problem

A lighting device according to a technology of the present disclosure includes: a light source that is disposed on one surface; a first reflective portion that reflects light from the light source toward a first direction that is one direction along the one surface and a second direction that is along the one surface and orthogonal to the first direction; and a second reflective portion that is disposed on a side of the first reflective portion in the second direction and reflects light from the first reflective portion toward the first direction.

Advantageous Effects of Invention

According to the technology of the present disclosure, it is possible to lengthen, in the second direction, a region illuminated with light directed in the first direction, as compared with the configuration including only one reflective portion (that is, the first reflective portion).

DESCRIPTION OF EMBODIMENTS

Hereinafter, an example of an embodiment according to the technology of the present disclosure will be described with reference to the drawings.

(Image Forming Device 10)

Figure 1:
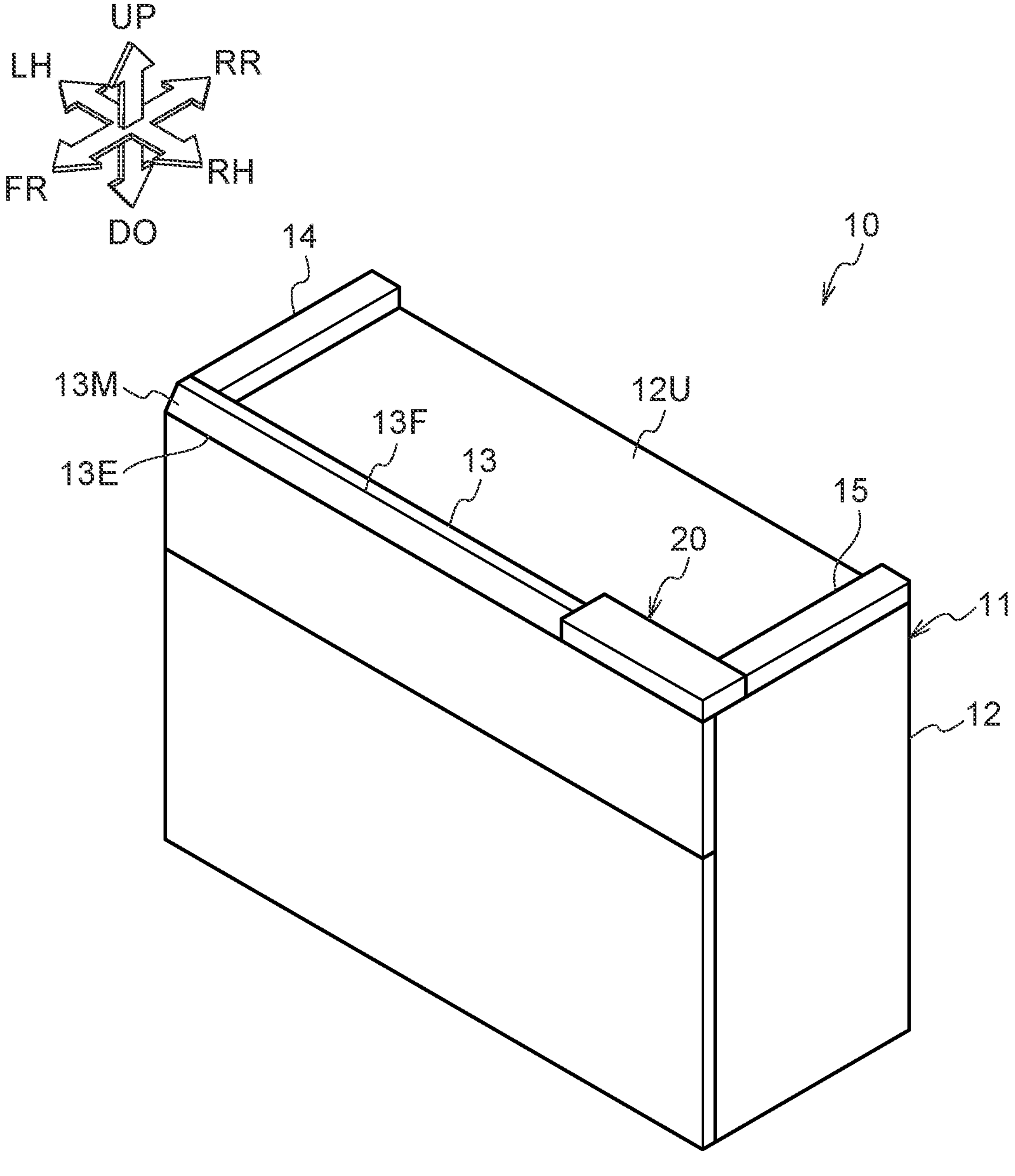
FIG. 1 is a perspective view showing an image forming device according to the present embodiment.
Figure 2:
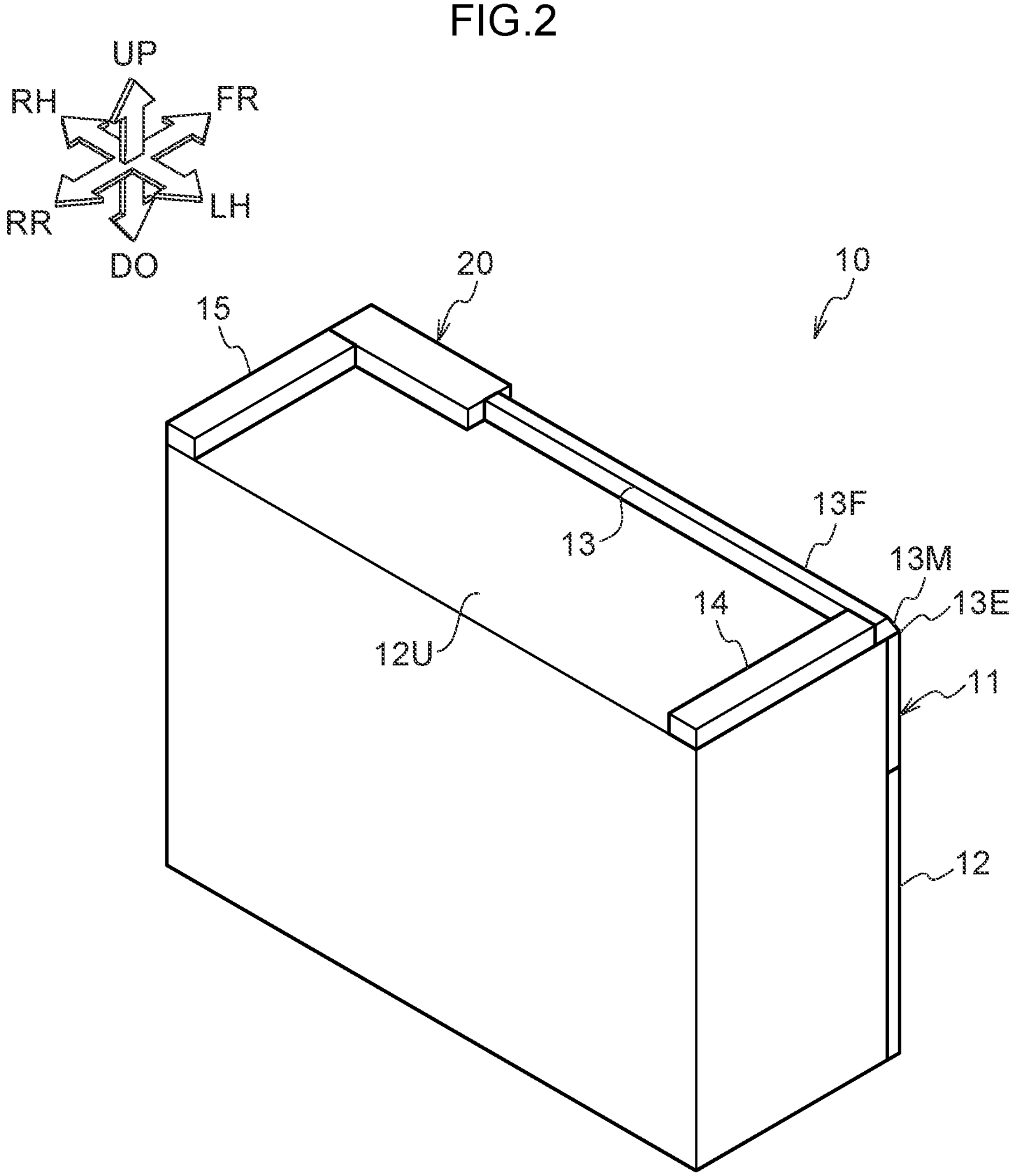
FIG. 2 is a perspective view showing the image forming device according to the embodiment when viewed from behind.

An image forming device 10 according to the present embodiment will be described. FIG. 1 is a perspective view showing the image forming device 10. FIG. 2 is a perspective view showing the image forming device 10 when viewed from behind.

An arrow UP shown in the drawing indicates the upper side (vertically upward) of the device, and an arrow DO indicates the lower side (vertically downward) of the device. An arrow LH in the drawing indicates the left side of the device, and an arrow RH indicates the right side of the device. An arrow FR in the drawing indicates the front side of the device, and an arrow RR indicates the rear side of the device. Since these directions are defined for convenience of description, the device configuration is not limited to these directions. When describing each direction of the device, the word “device” may be omitted. That is, for example, “the upper side of the device” may be simply referred to as “the upper side”.

In the following description, the term "top-bottom direction" may mean "both the top direction and the bottom direction" or "either the top direction or the bottom direction". The term "left-right direction" may be used to mean "both the right direction and the left direction" or "either the right direction or the left direction". The "left-right direction" can also be referred to as a lateral direction or a horizontal direction. The term "front-rear direction" may be used to mean "both the front direction and the rear direction" or "either the front direction or the rear direction". The "front-rear direction" can also be referred to as the lateral direction or the horizontal direction. The top-bottom direction, the left-right direction, and the front-rear direction are directions (specifically, orthogonal directions) crossing each other.

In addition, a symbol in which "x" is written in "○" in the drawing means an arrow directed from the front to the back of the paper surface. In addition, a symbol in which "•" is written in "○" in the drawing means an arrow directed from the back to the front of the paper surface.

The image forming device 10 shown in FIGS. 1 and 2 is a device that forms an image. Specifically, as shown in FIGS. 1 and 2, the image forming device 10 includes an image forming device main body 11, a lighting device 20, and an image forming unit 18 (see FIG. 11).

Note that the image forming device 10 is an example of a "mounting device". Hereinafter, each unit of the image forming device 10 will be described.

(Image Forming Device Main Body 11)

The image forming device main body 11 shown in FIGS. 1 and 2 is a portion where each component of the image forming device 10 is provided. As shown in FIGS. 1 and 2, the image forming device main body 11 is formed in a substantially rectangular parallelepiped shape. The lighting device 20 is mounted at a portion on the front-right side on the image forming device main body 11 (specifically, on an upper surface 12U of a housing 12 described below). Therefore, the lighting device 20 can be visually recognized from the front-right side of the image forming device main body 11.

Specifically, the image forming device main body 11 includes the housing 12 and projecting portions 13, 14, and 15. The housing 12 is formed in a rectangular parallelepiped shape. The projecting portion 13 is disposed on the front side on the upper surface 12U of the housing 12 and on the left side of the lighting device 20. The projecting portion 13 projects upward from the upper surface 12U of the housing 12 and extends in the left-right direction.

Figure 3:
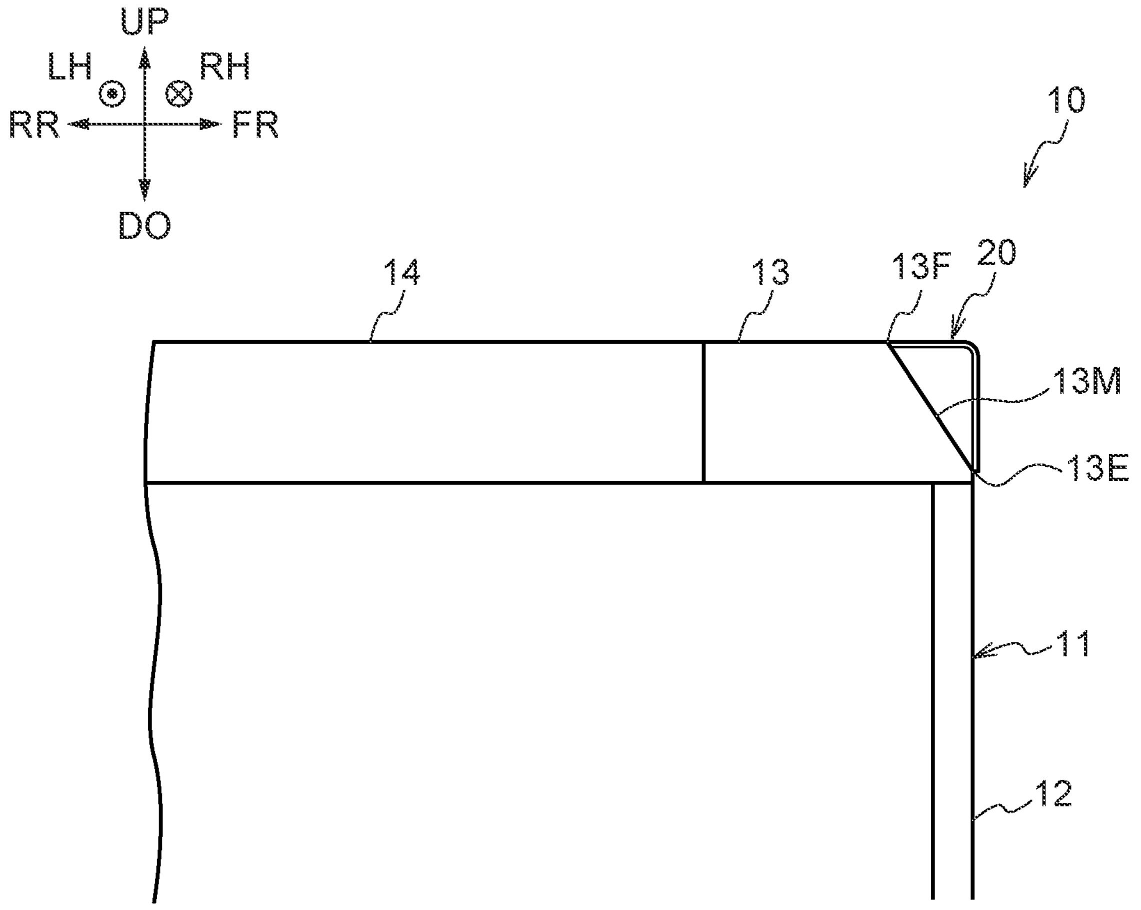
FIG. 3 is a left side view showing a part of the image forming device according to the embodiment.

In the projecting portion 13, a front end portion 13F at an upper edge is positioned more toward the rear side compared to a front end portion 13E at a lower edge. Therefore, as shown in FIG. 3, a front surface 13M of the projecting portion 13 is an inclined surface that is inclined in such a way as to gradually descend forward in a side view. The lighting device 20 projects more toward the front side compared to the front surface 13M of the projecting portion 13, and the lighting device 20 can be visually recognized from the left side of the image forming device main body 11. The side view refers to a case where a target (here, the projecting portion 13) is viewed from one of the left side and the right side of the object toward the other side.

As shown in FIGS. 1 and 2, the projecting portion 14 is disposed on the left side of the upper surface 12U of the housing 12 and on the rear side of the projecting portion 13. The projecting portion 14 projects upward from the upper surface 12U of the housing 12 and extends in the front-rear direction.

The projecting portion 15 is disposed on the right side of the upper surface 12U of the housing 12 and on the rear side of the lighting device 20. The projecting portion 15 projects upward from the upper surface 12U of the housing 12 and extends in the front-rear direction.

As shown in FIG. 2, an area on the rear side of the lighting device 20 and on the left side of the projecting portion 15 on the image forming device main body 11 is opened. Therefore, the lighting device 20 can be visually recognized from behind the image forming device main body 11.

The image forming device main body 11 is an example of a "mounting body". The projecting portion 13 is an example of an "arrangement portion".

(Image Forming Unit 18)

Figure 11:
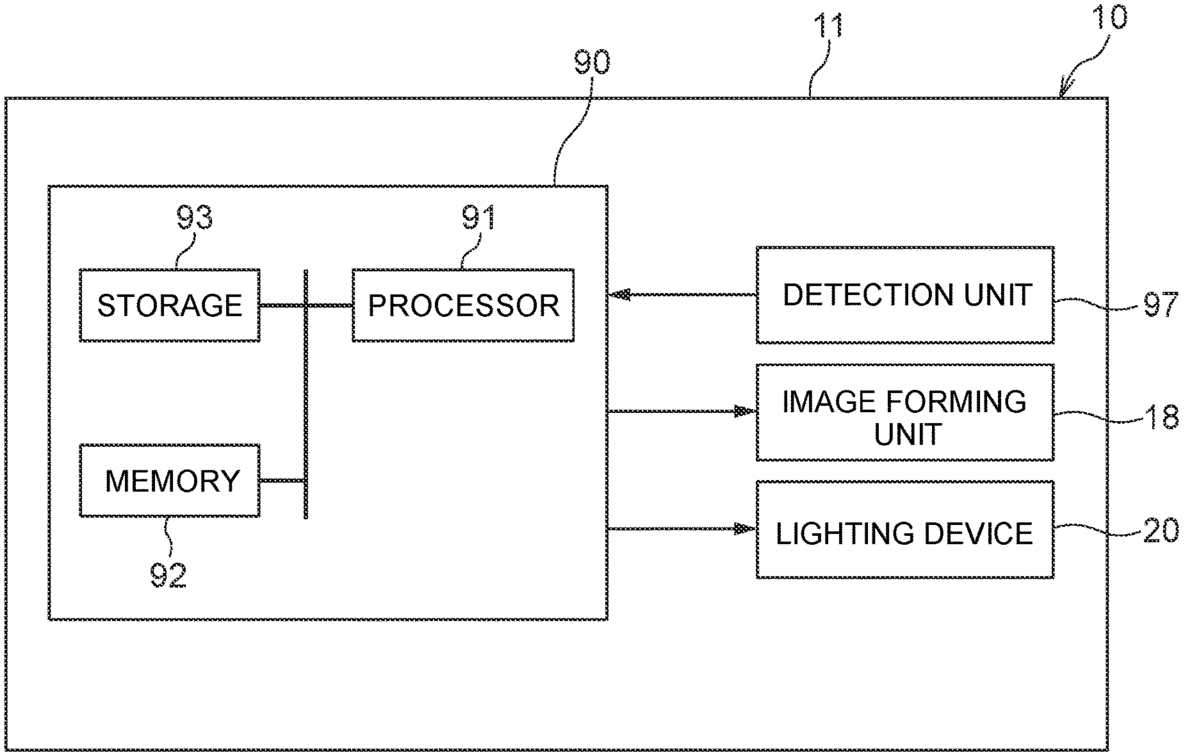
FIG. 11 is a block diagram showing an example of a hardware configuration of a control device according to the embodiment.

The image forming unit 18 shown in FIG. 11 is an example of an image forming unit that forms an image on a recording medium. Examples of the image forming unit 18 include an inkjet type image forming unit that forms an image on a recording medium by using an ink, an electrophotographic image forming unit that forms an image on a recording medium by using a toner, and the like.

In the inkjet type image forming unit, for example, ink droplets are ejected from an ejection unit onto a recording medium to form an image on the recording medium. The inkjet type image forming unit may form an image on a recording medium by ejecting ink droplets from the ejection unit to a transfer body and transferring the ink droplets from the transfer body to the recording medium.

In the electrophotographic image forming unit, for example, respective processes of charging, exposure, development, and transfer are performed to form an image on a recording medium. The electrophotographic image forming unit may form an image on a recording medium by performing the respective processes of charging, exposure, development, and transfer to form the image on a transfer body and transferring the image from the transfer body to the recording medium.

Examples of the image forming unit are not limited to the above-described inkjet type image forming unit and the above-described electrophotographic image forming unit, and various image forming units can be used.

(Lighting Device 20)

Figure 4:
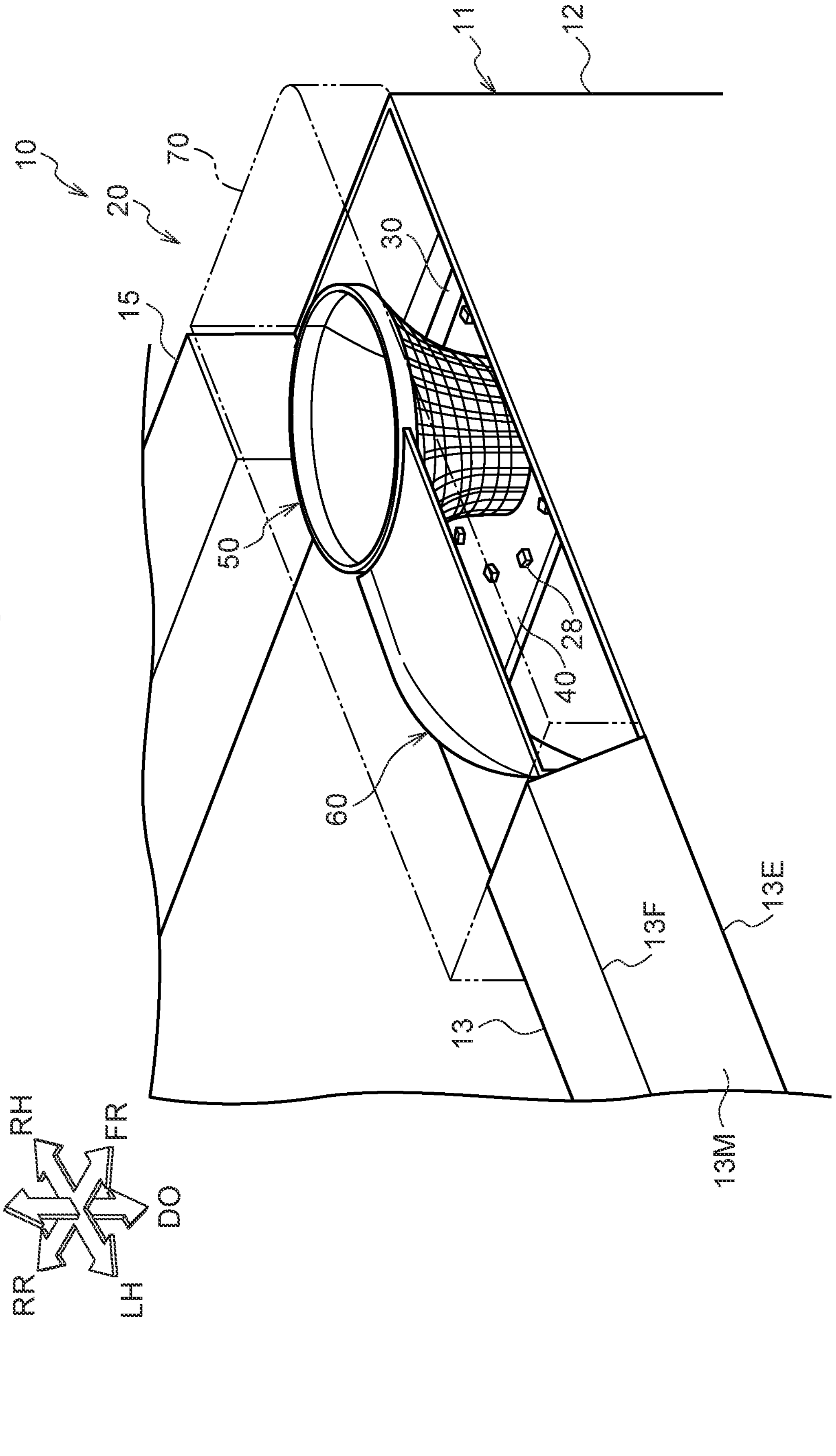
FIG. 4 is a perspective view showing a lighting device according to the embodiment.
Figure 5:
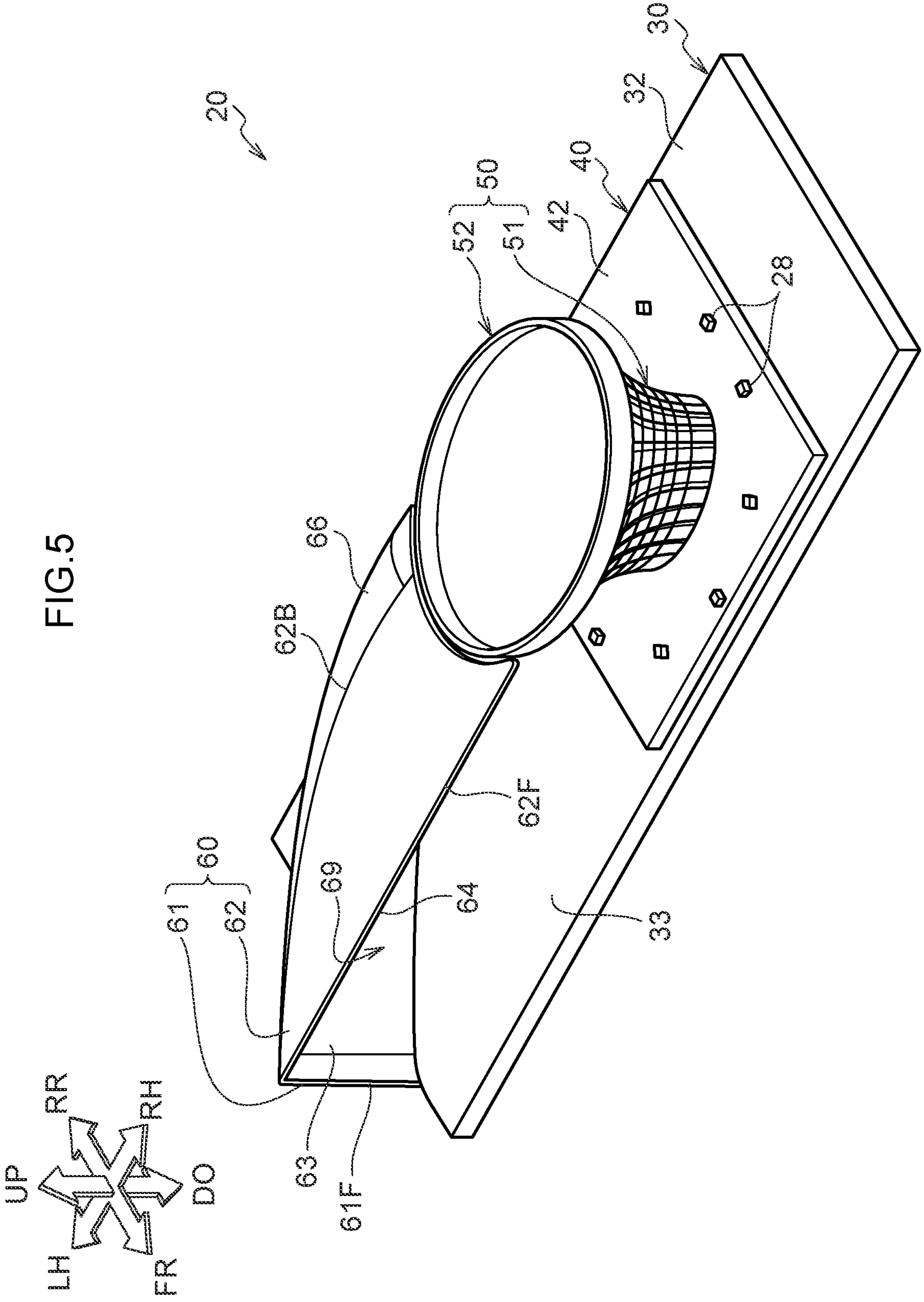
FIG. 5 is a perspective view showing the lighting device (a portion excluding a cover) according to the embodiment.
Figure 6:
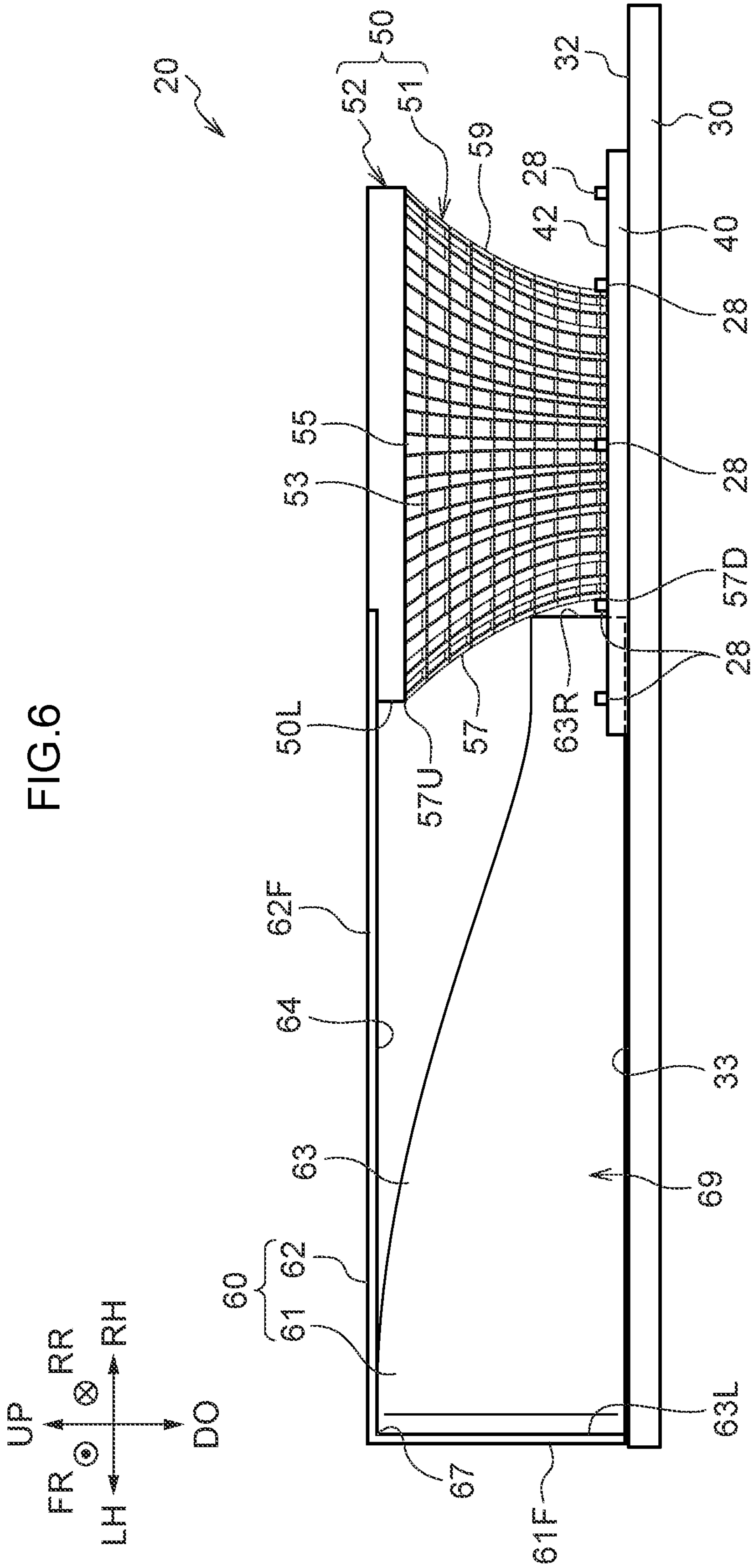
FIG. 6 is a front view showing the lighting device (the portion excluding the cover) according to the embodiment.
Figure 7:
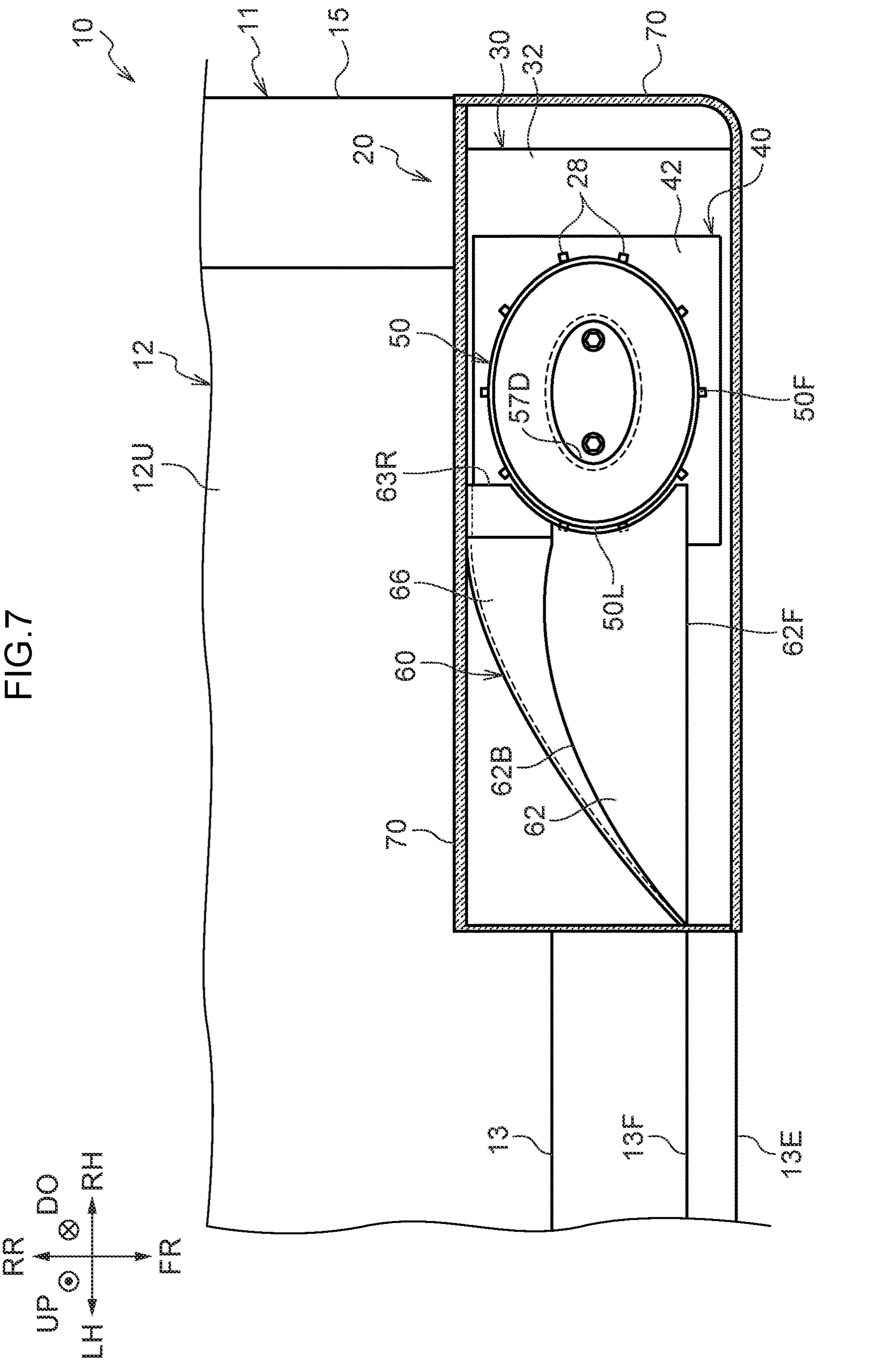
FIG. 7 is a horizontal cross-sectional view showing the lighting device according to the embodiment.
Figure 8:
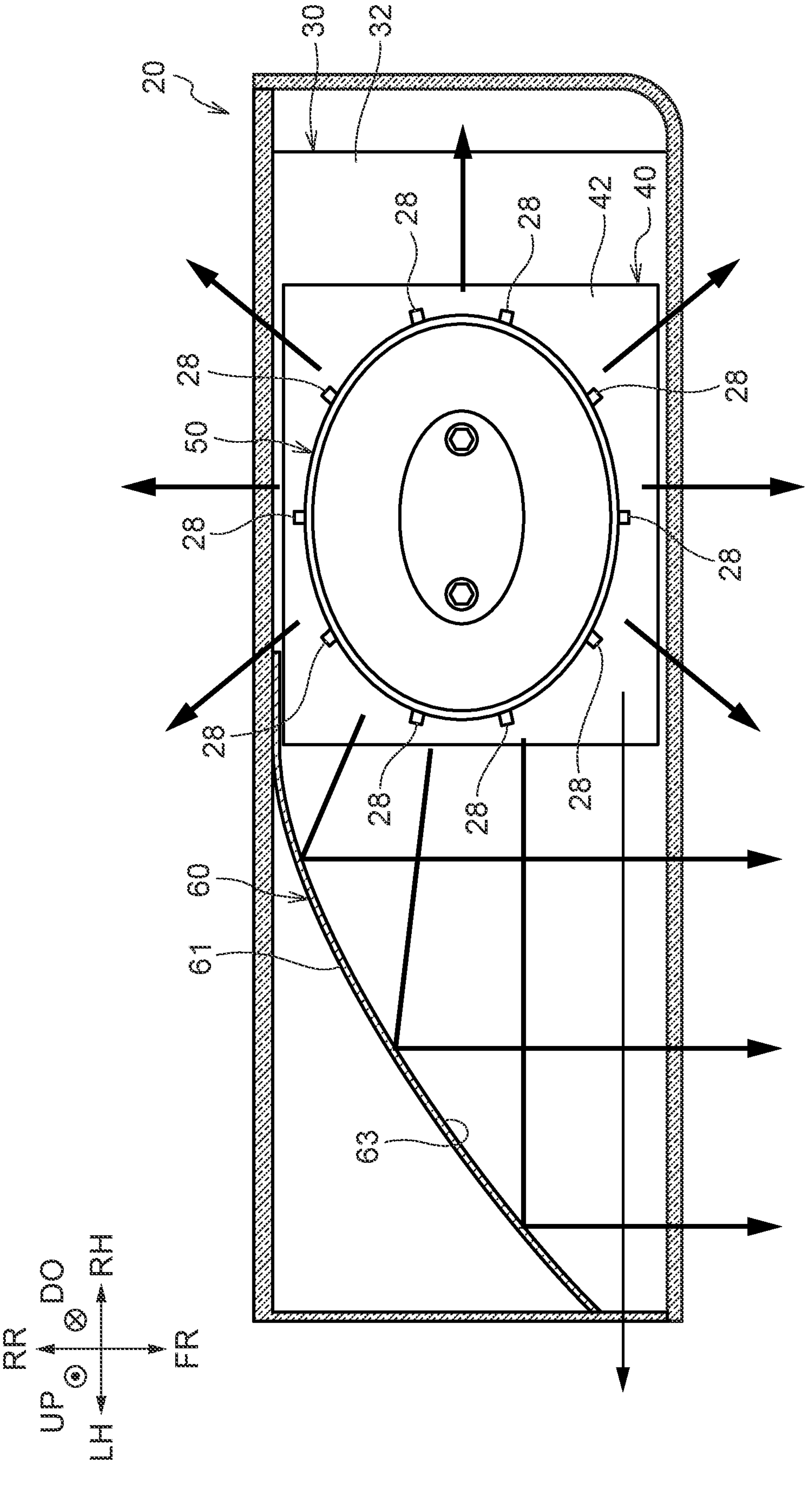
FIG. 8 is a horizontal cross-sectional view showing a path of reflected light in the lighting device according to the embodiment.
Figure 9:
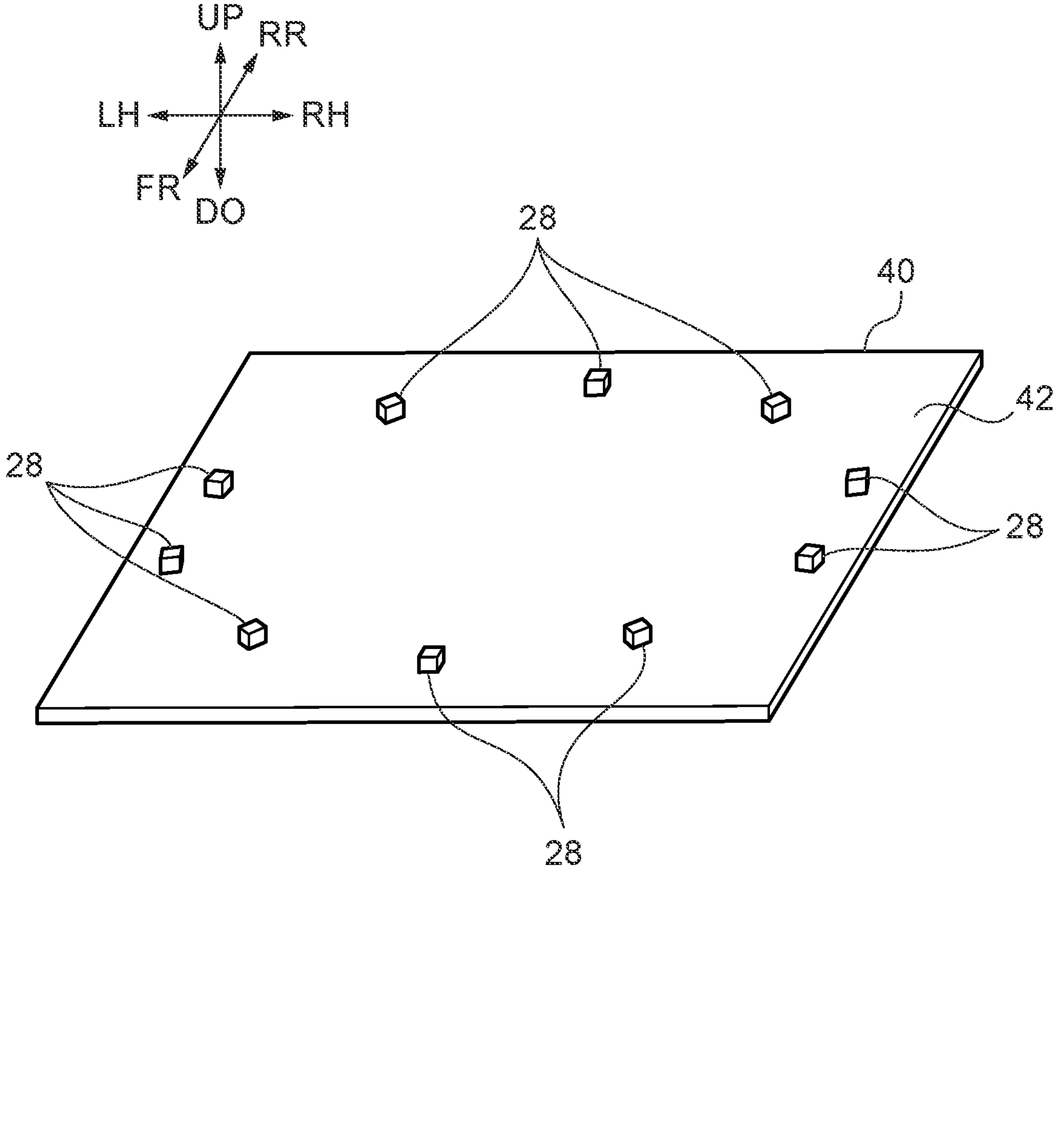
FIG. 9 is a perspective view showing a board and a light emitting element in the lighting device according to the embodiment.
Figure 10:
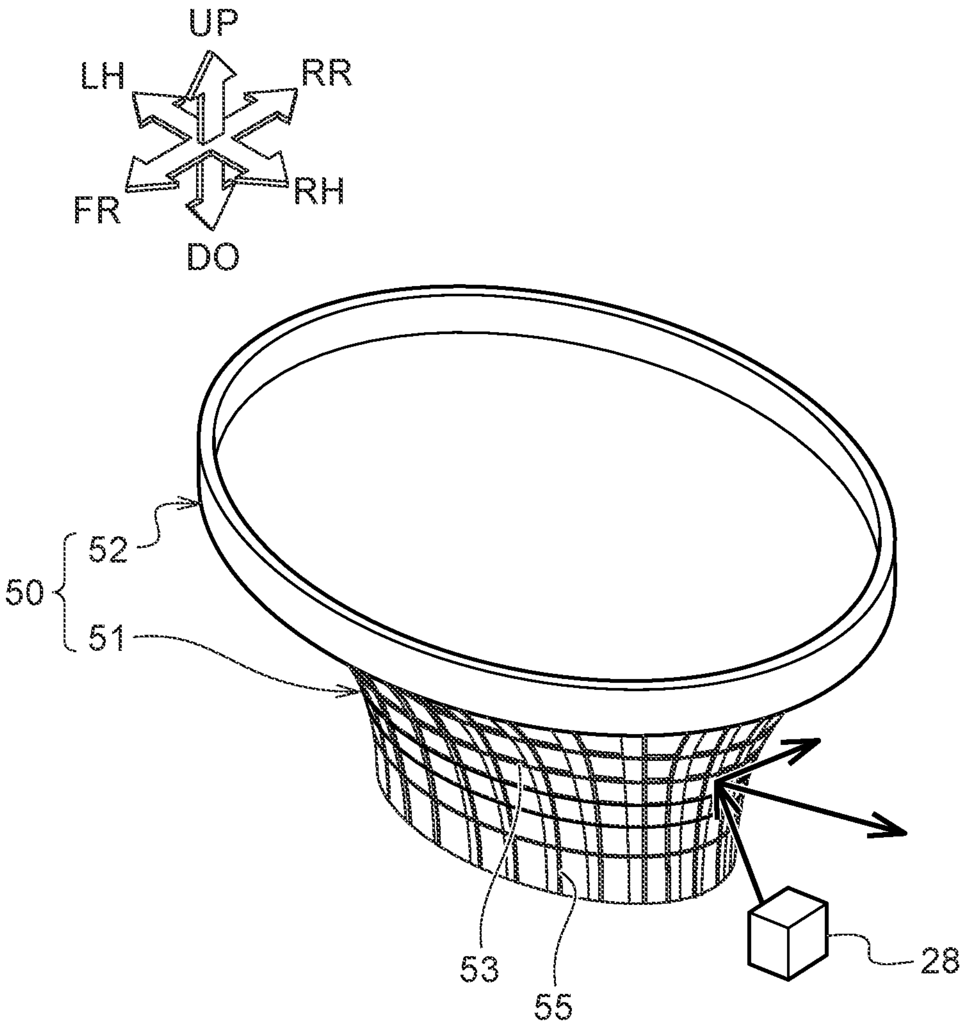
FIG. 10 is a perspective view showing a first reflector and a light emitting element in the lighting device according to the embodiment.

FIG. 4 is a perspective view showing the lighting device 20. FIG. 5 is a perspective view showing the lighting device 20 (a portion excluding a cover 70 described below). FIG. 6 is a front view showing the lighting device 20 (a portion excluding the cover 70 described below). FIG. 7 is a horizontal cross-sectional view showing the lighting device 20. FIG. 8 is a horizontal cross-sectional view showing a path of reflected light in the lighting device 20. FIG. 9 is a perspective view showing a board 40 and a light emitting element 28 described below in the lighting device 20. FIG. 10 is a perspective view showing a first reflector 50 and the light emitting element 28 described below in the lighting device 20.

The lighting device 20 shown in FIGS. 4 to 8 is a device that illuminates its own surroundings. Specifically, as shown in FIG. 4, the lighting device 20 includes a base 30, the board 40, the light emitting element 28, the first reflector 50, a second reflector 60, and the cover 70.

As shown in FIGS. 5, 6, and 7, the base 30 is a portion where each component of the lighting device 20 is disposed. As an example, the base 30 has a plate shape whose thickness direction is the top-bottom direction, and is formed in a rectangular shape elongated in the left-right direction in plan view.

The board 40 is disposed at a portion on the right side on an upper surface 32 of the base 30. A portion of the upper surface 32 of the base 30 on the left side of the board 40 is a reflective surface 33 that reflects light from the light emitting element 28. The base 30 is made of, for example, a resin material, and the upper surface 32 including the reflective surface 33 is, for example, a white surface. The upper surface 32 including the reflective surface 33 may be, for example, a plated surface, and it is sufficient if the upper surface 32 is any surface that reflects light.

As shown in FIGS. 5, 6, and 9, the board 40 is formed in a rectangular plate shape with the top-bottom direction as the thickness direction, as an example. As an example, the board 40 is implemented by a printed circuit board. The board 40 has an upper surface 42 facing upward. Specifically, the upper surface 42 is a horizontal plane along the horizontal direction.

As an example, the light emitting element 28 is implemented by a light emitting diode (LED) element. As shown in FIGS. 8 and 9, a plurality of light emitting elements 28 are arranged in an elliptical shape on the upper surface 42 of the board 40. Specifically, as shown in FIG. 8, the plurality of light emitting elements 28 are disposed on the front side, the rear side, the left side, and the right side of the first reflector 50 in plan view. More specifically, in plan view, one light emitting element 28 is disposed on each of the front side and the rear side of the first reflector 50, two light emitting elements 28 are disposed on each of the left side and the right side of the first reflector 50, and one light emitting element 28 is disposed on each of the left oblique front side, the right oblique front side, the left oblique rear side, and the right oblique rear side of the first reflector 50. As described above, ten light emitting elements 28 are disposed around the first reflector 50. The plan view refers to a case where a target (here, the light emitting element 28) is viewed from above.

The light emitting element 28 emits light with an upward spread (see FIG. 10). It is sufficient if the light emitting element 28 is a light source that irradiates at least the first reflector 50 with light. The light emitting element 28 can selectively emit light in a plurality of colors (for example, blue and red).

The first reflector 50 has a function of reflecting light from the light emitting element 28 to the front side, the rear side, the left side, and the right side. As shown in FIGS. 5 and 6, the first reflector 50 is disposed on the upper surface 42 of the board 40. The first reflector 50 is made of, for example, a resin material, and the surface of the first reflector 50 is, for example, a white surface. The surface of the first reflector 50 may be, for example, a plated surface, and it is sufficient if the surface of the first reflector 50 is any surface that reflects light.

As shown in FIGS. 5 and 8, the first reflector 50 has an elliptical shape with the left-right direction as a major axis in plan view, and is formed in a cylindrical shape with the top-bottom direction as an axial direction as shown in FIGS. 5 and 10. As shown in FIG. 6, the first reflector 50 has a curved portion 51 that is curved in such a way as to be gradually increased in diameter upward from the board 40 toward an outer peripheral side, and an upper portion 52 that extends upward from an upper end of the curved portion 51.

An outer peripheral surface of the curved portion 51 is inclined in a curved shape toward each of the left side and the right side while extending upward in a rear view, and is curved in such a way as to be convex inward. In other words, the first reflector 50 has reflective surfaces 57 and 59 inclined in a curved shape toward the left side and the right side while extending upward in a rear view. The rear view refers to a case where a target (here, the first reflector 50) is viewed from the front.

As shown in FIGS. 6 and 10, a projecting portion 53 that projects radially outward and is formed over the entire circumference along a circumferential direction of the curved portion 51, and a projecting portion 55 that projects radially outward and is formed along the top-bottom direction from a lower end to the upper end of the curved portion 51 are formed on the outer peripheral surface of the curved portion 51. A plurality of projecting portions 53 are arranged in the top-bottom direction. A width of the projecting portion 55 in the circumferential direction of the curved portion 51 gradually increases from the lower end to the upper end of the curved portion 51. A plurality of the projecting portions 55 are arranged in the circumferential direction of the curved portion 51 and cross the projecting portions 53. As described above, the projecting portion 53 and the projecting portion 55 cross each other, whereby the projecting portions 53 and 55 are arranged in a lattice pattern on the outer periphery of the curved portion 51.

On the other hand, as shown in FIGS. 6 and 10, the upper portion 52 is formed in an elliptical cylindrical shape linearly extending upward from the upper end of the curved portion 51. An outer peripheral surface of the upper portion 52 is an elliptical cylindrical surface without unevenness.

In the first reflector 50, the curved portion 51 diffusely reflects light from the light emitting element 28 in a direction of 360 degrees including the front side, the rear side, the left side, and the right side by the outer peripheral surface of the curved portion 51 and the projecting portions 53 and 55 (see FIG. 10). The first reflector 50 also reflects light from the light emitting element 28 in a direction of 360 degrees including the front side, the rear side, the left side, and the right side by the upper portion 52.

The second reflector 60 is disposed on the left side of the first reflector 50 as shown in FIGS. 5 to 8, and has a function of reflecting light from the first reflector 50 to the front side as shown in FIG. 8. Similarly to the first reflector 50, the second reflector 60 is made of, for example, a resin material, and the surface of the second reflector 60 is, for example, a white surface. The surface of the second reflector 60 may be, for example, a plated surface, or it is sufficient if the surface of the second reflector 60 is any surface that reflects light.

As shown in FIGS. 5 and 6, the second reflector 60 has an extending portion 61 extending upward from the upper surface 32 of the base 30, a facing portion 62 facing the upper surface 32 of the base 30, and a connecting portion 66 connecting the extending portion 61 and the facing portion 62. As shown in FIG. 8, the extending portion 61 has a reflective surface 63 that faces forward and is concavely curved forward. The extending portion 61 is formed in a plate shape whose thickness direction is a direction crossing the reflective surface 63. A curvature of the reflective surface 63 decreases toward the left side.

As shown in FIG. 6, the facing portion 62 faces the upper surface of the base 30 in a state of being separated from the upper surface, and has a reflective surface 64 facing downward. The facing portion 62 is formed in a plate shape whose thickness direction is a direction crossing the reflective surface 64. A rear end portion 62B of the facing portion 62 is concavely curved forward along the extending portion 61, and the width in the front-rear direction gradually decreases from the right side to the left side. A right end portion of the facing portion 62 is concavely curved along a part of the upper portion 52 of the first reflector 50 in the circumferential direction. As shown in FIG. 5, the connecting portion

66 connects the rear end portion of the facing portion 62 and an upper end portion of the extending portion 61, and the extending portion 61, the facing portion 62, and the connecting portion 66 are integrally formed.

As shown in FIGS. 6 and 7, a right end portion 63R of the reflective surface 63 of the second reflector 60 is disposed more toward the right side compared to a left end portion 50L of the first reflector 50. That is, as shown in FIG. 6, a right-side portion of the reflective surface 63 of the second reflector 60 overlaps a left-side portion of the first reflector 50 when viewed from behind. The right end portion 63R of the reflective surface 63 is disposed more toward the left side compared to a lower end portion 57D of a reflective surface 57.

The reflective surface 64 of the second reflector 60 is disposed more toward the upper side compared to an upper end portion 57U of the reflective surface 57 of the first reflector 50. Specifically, the reflective surface 64 of the second reflector 60 is disposed within a range from a lower end to an upper end of the upper portion 52 of the first reflector 50. In the embodiment, an upper surface of the facing portion 62 of the second reflector 60 and an upper surface of the first reflector 50 are disposed on the same plane.

A left end portion 63L of the reflective surface 63 of the second reflector 60 faces the right side in a rear view, and the left end portion 63L is a reflective surface extending downward from a left end portion of the reflective surface 64. The reflective surface 64 and the left end portion 63L of the reflective surface 63 form an angular corner portion 67. Since the left end portion 63L of the reflective surface 63 is also a portion of a front-side end of the reflective surface 63, the left end portion 63L can also be said a front end portion of the reflective surface 63. The angular corner portion 67 is a corner portion 67 whose radius of curvature of an inner peripheral surface is equal to or less than a thickness of the second reflector 60. Therefore, in a case where the radius of curvature of the inner peripheral surface of the corner portion 67 exceeds the thickness of the second reflector 60, the corner portion 67 is a rounded corner.

An opening 69 surrounded by a front end portion 62F of the facing portion 62 of the second reflector 60, a front end portion 61F of the extending portion 61, and the reflective surface 33 of the base 30 is formed on the front side of the reflective surface 63. Light reflected by the reflective surface 63 and the reflective surface 64 of the second reflector 60 and the reflective surface 33 of the base 30 is emitted from the opening 69. The front end portion 62F of the facing portion 62 and the front end portion 61F of the extending portion 61 are also portions of the front end side of the second reflector 60, and thus can also be referred to as front end portions of the second reflector 60.

In the embodiment, as shown in FIG. 7, the front end portions (that is, the front end portion 62F of the facing portion 62 and the front end portion 61F of the extending portion 61) of the second reflector 60 are disposed more toward the rear side compared to a front end portion 50F of the first reflector 50. That is, the first reflector 50 projects more toward the front side compared to the second reflector 60. As a result, as shown in FIG. 8, the second reflector 60 reflects, toward the front side, a part of light reflected toward the left side from the first reflector 50 and allows the other part of the light to pass toward the left side. That is, the second reflector 60 does not block the other part of the light. In addition, the second reflector 60 does not block the light reflected from the first reflector 50 toward the rear side and the right side, and allows the light to be emitted to the outside of the lighting device 20.

Further, in the embodiment, as shown in FIG. 7, the front end portion 50F of the first reflector 50 is disposed more toward the front side compared to the front end portion 13F at an upper edge of the projecting portion 13. On the other hand, the front end portions (that is, the front end portion 62F of the facing portion 62 and the front end portion 61F of the extending portion 61) of the second reflector 60 are disposed at an identical position to that of the front end portion 13F at the upper edge of the projecting portion 13 in the front-rear direction.

As shown in FIGS. 4 and 7, the cover 70 is disposed on the front side, the rear side, the left side, the right side, and the upper side of the first reflector 50 and the second reflector 60, and covers these sides. As an example, the cover 70 is made of a transparent resin material, and can transmit light such as reflected light from the first reflector 50 and the second reflector 60.

As described above, in the lighting device 20, the first reflector 50 and the second reflector 60 reflect the light from the light emitting element 28 to illuminate the front side, as a result of which a brightness is the highest at a position where the first reflector 50 is disposed in the left-right direction, and gradually decreases toward the left side. That is, the lighting device 20 performs illumination having a gradient. Having a gradient means a state in which there are variations in brightness, and the variations continuously changes.

The upper surface 42 of the board 40 is an example of "one surface". The light emitting element 28 is an example of a "light source". The first reflector 50 is an example of a "first reflector". The second reflector 60 is an example of a "second reflector".

The front side is one direction along the upper surface 42 of the board 40, which is an example of a "first direction". As described above, in the embodiment, a direction facing the front side is an example of the "first direction". The left side is a direction along one surface and crossing the front, and is an example of a "second direction". As described above, in the embodiment, a direction facing the left side is an example of the "second direction". The rear side is an example of a "direction opposite to the first direction". The right side is an example of a "direction opposite to the second direction". The upper side is an example of a "separation direction that crosses one surface". The lower side is an example of a "direction opposite to the separation direction".

The reflective surface 63 of the second reflector 60 is an example of a "reflective surface facing the first direction", and is also an example of a "reflective surface facing the first direction and concavely curved in the first direction". A portion of the reflective surface 63 excluding the left end portion 63L faces the front side (an example of the first direction). Therefore, the "reflective surface facing the first direction" may include a portion facing a direction other than the first direction. The "reflective surface facing the first direction" is a reflective surface that can be visually recognized as a surface when viewed in the direction opposite to the first direction. Specifically, the "reflective surface facing the first direction" is a surface that reflects, in the first direction, light emitted in the second direction, and is a surface that is not orthogonal to the first direction (that is, a surface inclined with respect to the first direction). A right end portion of the reflective surface 63 is an example of a "first end portion facing the direction opposite to the second direction". A left end portion of the first reflector 50 is an example of a "second end portion facing the second direction".

The reflective surface 57 of the first reflector 50 is an example of a "reflective surface or a first reflective surface inclined toward the second direction while extending away from the one surface in a separation direction. A lower end portion of the reflective surface 57 is an example of an "end portion facing the one surface".

The reflective surface 64 of the second reflector 60 is an example of a "reflective surface or a second reflective surface facing the direction opposite to the separation direction". The left end portion 63L of the reflective surface 63 is an example of a "reflective surface extending in the opposite direction from an end portion of the reflective surface in the second direction". The front end portion is an example of a "an end portion in the first direction".

(Control Device 90)

A control device 90 has a control function of performing control to change an illumination state of the lighting device 20 according to an operation state of the image forming device 10. Specifically, the control device 90 performs control to change the illumination state of the lighting device 20 between an execution state in which the image forming unit 18 is executing an image forming operation and a stop state in which the image forming unit 18 abnormally stops.

Specifically, as shown in FIG. 11, the control device 90 includes a processor 91, a memory 92, and a storage 93. The control device 90 may be a device that controls the operation of each unit of the image forming device 10 including the image forming unit 18 and the lighting device 20.

In the embodiments described above, the processor refers to a processor in a broad sense, and examples of the processor 91 include a general-purpose processor (for example, a central processing unit (CPU)) and a dedicated processor (for example, a graphics processing unit (GPU), an application specific integrated circuit (ASIC), a field programmable gate array (FPGA), or a programmable logic device).

The storage 93 stores various programs including a control program 93A (see FIG. 15) and various data. Specifically, the storage 93 is implemented by a recording device such as a hard disk drive (HDD), a solid state drive (SSD), or a flash memory.

The memory 92 is a work area for the processor 91 to execute various programs, and temporarily records various programs or various data in a case where the processor 91 executes processing. The processor 91 reads various programs including the control program 93A from the storage 93 to the memory 92, and executes the program by using the memory 92 as a work area.

Figure 12:
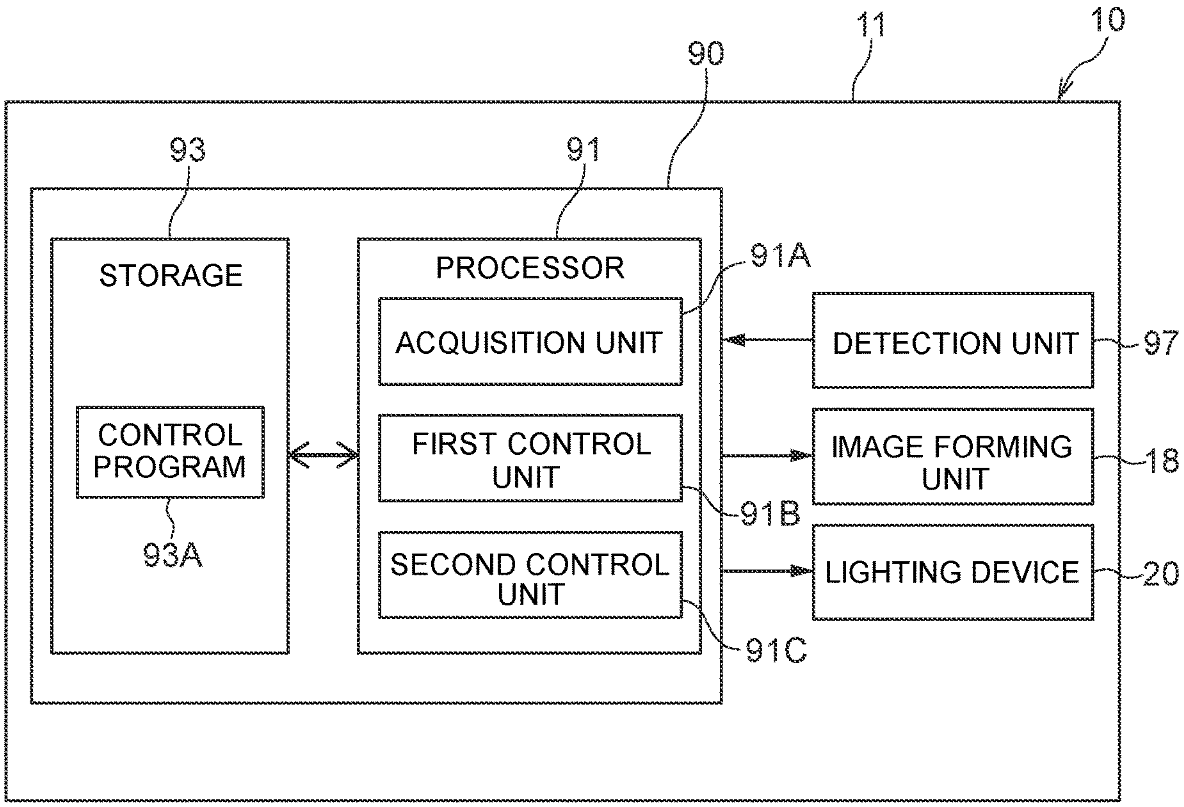
FIG. 12 is a block diagram showing an example of a functional configuration of a processor of the control device according to the embodiment.

In the control device 90, the processor 91 executes the control program 93A to implement various functions. Hereinafter, a functional configuration implemented by cooperation of the processor 91 as a hardware resource and the control program 93A as a software resource will be described. FIG. 12 is a block diagram showing a functional configuration of the processor 91.

As shown in FIG. 12, in the control device 90, the processor 91 executes the control program 93A to function as an acquisition unit 91A, a first control unit 91B, and a second control unit 91C.

The acquisition unit 91A acquires an execution instruction for executing the image forming operation of forming an image on a recording medium by the image forming unit 18. In addition, the acquisition unit 91A acquires inoperability information indicating that the image forming unit 18 cannot be operated, such as a recording medium jam, runout of ink, and runout of toner, based on a detection result of a detection unit 97 such as a sensor disposed in the image forming device main body 11.

The first control unit 91B controls the image forming unit 18 to execute the image forming operation in a case where the acquisition unit 91A has acquired the execution instruction for executing the image forming operation and has not acquired the above-described inoperability information.

In a case where the acquisition unit 91A has acquired the execution instruction for executing the image forming operation and the acquisition unit 91A has acquired the above-described inoperability information, the first control unit 91B controls the image forming unit 18 to abnormally stop. In addition, after controlling the image forming unit 18 to execute the image forming operation, in a case where the acquisition unit 91A has acquired the above-described inoperability information before the execution of the image forming operation in the image forming unit 18 is completed, the first control unit 91B controls the image forming unit 18 to abnormally stop.

In a case where the acquisition unit 91A has acquired the execution instruction for executing the image forming operation and has not acquired the above-described inoperability information, the second control unit 91C controls the lighting device 20 to perform illumination in a first illumination state.

In a case where the acquisition unit 91A has acquired the execution instruction for executing the image forming operation, and the acquisition unit 91A has acquired the above-described inoperability information, the second control unit 91C controls the lighting device 20 to perform illumination in a second illumination state different from the first illumination state. In addition, after the first control unit 91B controls the image forming unit 18 to execute the image forming operation, in a case where the acquisition unit 91A has acquired the above-described inoperability information before the execution of the image forming operation in the image forming unit 18 is completed, the second control unit 91C controls the lighting device 20 to perform illumination in the second illumination state.

The first illumination state is, for example, a state in which the light emitting element 28 is caused to emit blue light, so that the lighting device 20 emits blue light. The second illumination state is, for example, a state in which the light emitting element 28 is caused to emit red light, so that the lighting device 20 emits red light. As described above, in the embodiment, the lighting device 20 functions as a display device showing the operation state of the image forming device 10.

The control device 90 may change the illumination state of the lighting device 20 to three or more states. Furthermore, the control device 90 may change the illumination state of the lighting device 20 not only by color but also by turning on and blinking. In addition, the control device 90 may change the illumination state of the lighting device 20 for a normally stopped state and an inactive state included in the operation state of the image forming device 10.

(Operation According to Embodiment)

In the lighting device 20, as described above, the second reflector 60 is disposed on the left side of the first reflector 50 as shown in FIGS. 5 to 8, and reflects light from the first reflector 50 to the front side as shown in FIG. 8. Therefore, as compared with a configuration in which the lighting device 20 includes only the first reflector 50, a region illuminated with the light directed toward the front side can be lengthened in the left-right direction.

Further, it is possible to add a gradient in the left-right direction in the illumination region of the lighting device 20 without increasing the number of light emitting elements 28 by reflecting light using the second reflector 60 in addition to the first reflector 50.

In the embodiment, the right end portion 63R of the reflective surface 63 of the second reflector 60 is disposed more toward the right side compared to the left end portion 50L of the first reflector 50 as shown in FIGS. 6 and 7. Therefore, as compared with a configuration in which the right end portion 63R of the reflective surface 63 is disposed more toward the left side compared to the left end portion 50L of the first reflector 50, a decrease in light quantity at a boundary portion between a region illuminated with reflected light from the first reflector 50 and a region illuminated with reflected light from the second reflector 60 is suppressed.

In the embodiment, the right end portion 63R of the reflective surface 63 is disposed more toward the left side compared to the lower end portion 57D of the reflective surface 57. Therefore, as compared with a configuration in which the right end portion 63R of the reflective surface 63 is disposed more toward the right side compared to the lower end portion 57D of the reflective surface 57, an excessive increase in light quantity at a portion where the region illuminated with the reflected light from the first reflector 50 and the region illuminated with the reflected light from the second reflector 60 overlap with each other is suppressed.

In the embodiment, the reflective surface 64 of the second reflector 60 is disposed more toward the upper side compared to the upper end portion 57U of the reflective surface 57 of the first reflector 50. Therefore, as compared with a configuration in which the reflective surface 64 of the second reflector 60 is disposed more toward the lower side compared to the upper end portion 57U of the reflective surface 57 of the first reflector 50, a decrease in light quantity at an upper end portion in the illumination region of the lighting device 20 is suppressed.

Figure 13:
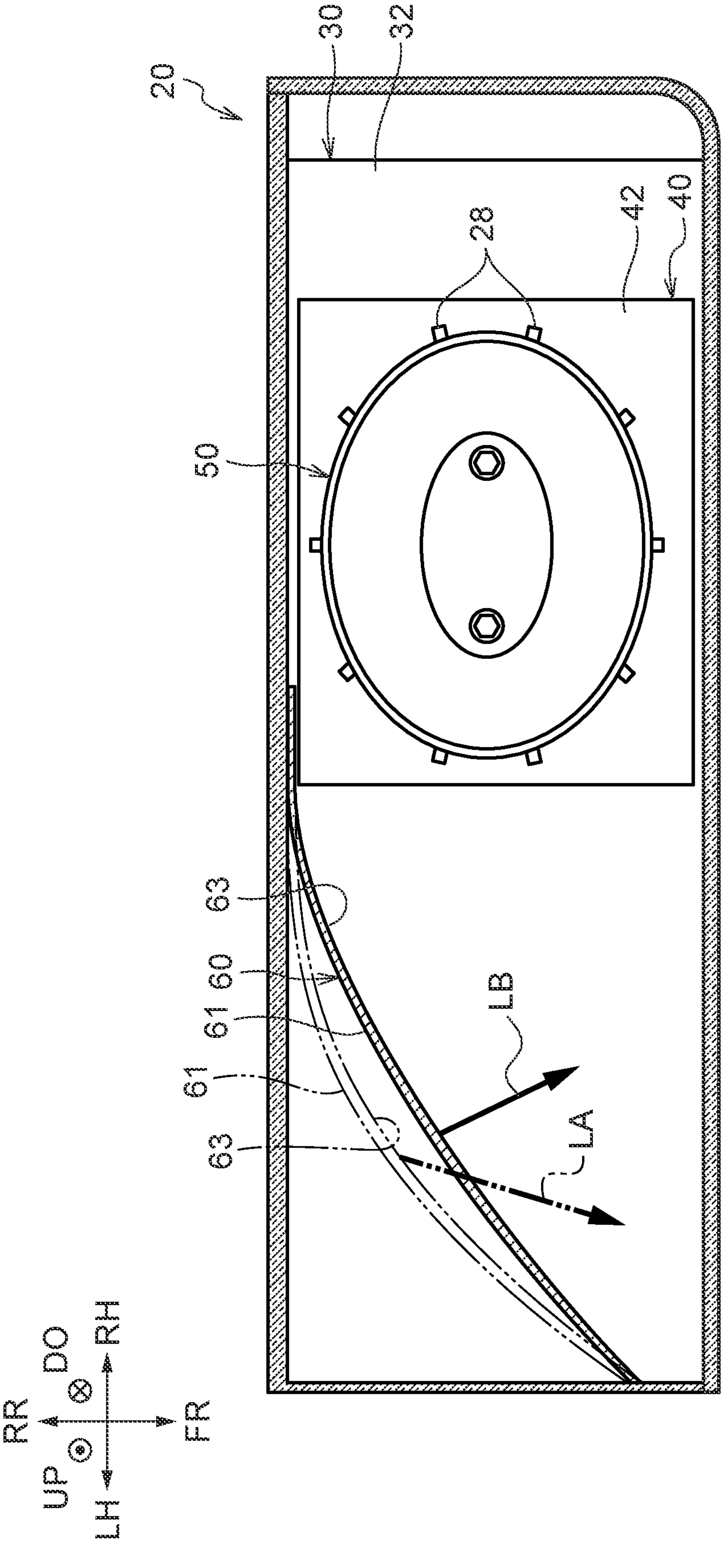
FIG. 13 is a horizontal cross-sectional view for comparing a configuration in which a curvature of a reflective surface of a second reflector decreases toward a left side and a configuration in which the curvature of the reflective surface of the second reflector increases toward the left side in the lighting device according to the embodiment.

In the embodiment, the curvature of the reflective surface 63 of the second reflector 60 decreases toward the left side as shown in FIGS. 8 and 13. Here, in a configuration in which the curvature of the reflective surface 63 increases toward the left side (hereinafter, referred to as a configuration A) as indicated by a line with alternating long and short dashes in FIG. 13, components toward the left oblique front side (that is, the left side of the front surface of the lighting device 20) (see Reference Sign LA) are more than component toward the right oblique front side (that is, the right side of the front surface of the lighting device 20) in light reflected toward the front side by the reflective surface 63.

On the other hand, in the embodiment, the curvature of the reflective surface 63 of the second reflector 60 decreases toward the left side, and thus, the components toward the right oblique front side (that is, the right side of the front surface of the lighting device 20) (see Reference Sign LB) are more than the components toward the left oblique front side (that is, the left side of the front surface of the lighting device 20) in light reflected toward the front side by the reflective surface 63. Therefore, as compared with the configuration A, a decrease in light quantity at the boundary portion between the region illuminated with the reflected light from the first reflector 50 and the region illuminated with the reflected light from the second reflector 60 is suppressed.

Figure 14:
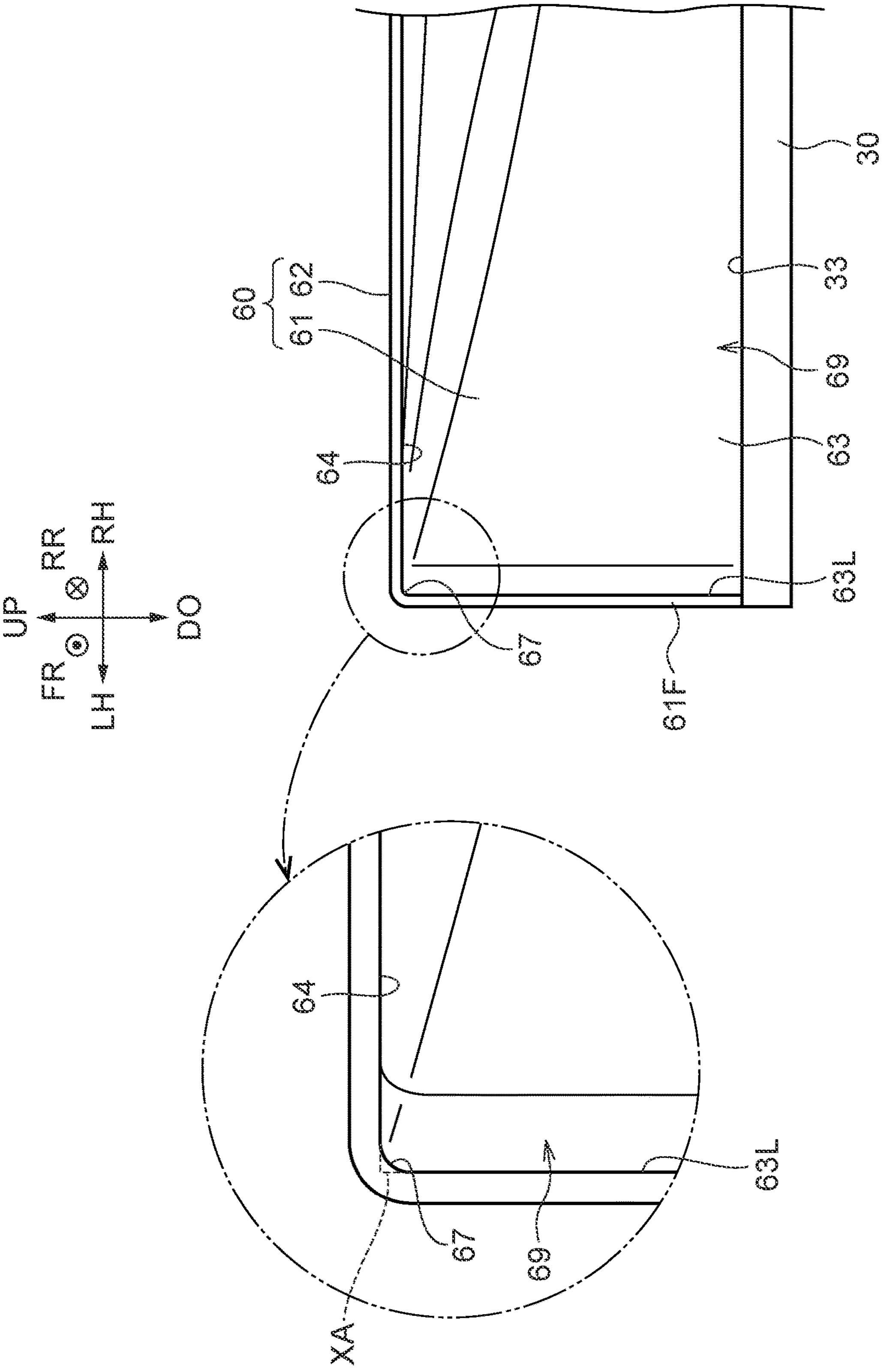
FIG. 14 is a front view showing a configuration in which corners of the second reflector are rounded in the lighting device according to the embodiment.

In the embodiment, the reflective surface 64 and the left end portion 63L of the reflective surface 63 form the angular corner portion 67. Here, as shown in FIG. 14, in a configuration in which the corner portion 67 formed by the reflective surface 64 and the left end portion 63L of the reflective surface 63 is rounded (hereinafter, referred to as a configuration B), the area of the opening 69 is reduced at the corner portion due to the rounded corner portion 67. That is, the size of the opening 69 is reduced by the size of a region indicated by a broken line XA in FIG. 14. Therefore, the quantity of light emitted from the opening 69 decreases at the corner portion. On the other hand, in the embodiment, since the angular corner portion 67 is formed by the reflective surface 64 and the left end portion 63L of the reflective surface 63, a decrease in light quantity at the corner portion of the illumination region of the lighting device 20 is suppressed as compared with the configuration B.

Further, in the embodiment, as shown in FIG. 8, the second reflector 60 reflects, toward the front side, a part of light reflected toward the left side from the first reflector 50 and allows the other part of the light to pass toward the left side. Therefore, the left side of the lighting device 20 is illuminated.

In the embodiment, the second reflector 60 does not block light reflected from the first reflector 50 toward the rear side and the right side, and allows the light to be emitted to the outside of the lighting device 20. Therefore, the rear side and the right side of the lighting device 20 are illuminated.

In the embodiment, the front end portion 50F of the first reflector 50 is disposed more toward the front side compared to the front end portion 13F at the upper edge of the projecting portion 13. Therefore, blocking of light emitted from the lighting device 20 toward the left side is suppressed as compared with a configuration in which the front end portion 50F of the first reflector 50 is disposed more toward the rear side compared to the front end portion 13F at the upper edge of the projecting portion 13. Therefore, light of the lighting device 20 can be visually recognized from the left side of the image forming device 10 (specifically, the image forming device main body 11).

In the embodiment, the front end portions (that is, the front end portion 62F of the facing portion 62 and the front end portion 61F of the extending portion 61) of the second reflector 60 are disposed at an identical position to that of the front end portion 13F at the upper edge of the projecting portion 13 in the front-rear direction. Therefore, the quantity of light illuminating the left side of the image forming device 10 (specifically, the image forming device main body 11) is larger than that in a configuration in which the front end portion of the second reflector 60 is disposed more toward the front side compared to the front end portion 13F at the upper edge of the projecting portion 13.

In the embodiment, the control device 90 performs control to change the illumination state of the lighting device 20 according to the operation state of the image forming device 10. Therefore, it is possible to grasp the operation state of the image forming device 10 by confirming the illumination state of the lighting device 20.

Specifically, the control device 90 performs control to change the illumination state of the lighting device 20 between an execution state in which the image forming unit 18 is executing an image forming operation and a stop state in which the image forming unit 18 abnormally stops. Therefore, it is possible to grasp whether the image forming device 10 is in the execution state or the stop state by confirming the illumination state of the lighting device 20.

Modified Example

In the embodiment, the light emitting element 28 is used as an example of the light source, but the disclosure is not limited thereto. Examples of the light source may include a lamp such as a fluorescent lamp, and it is sufficient if the light source is any light source that emits light.

In the embodiment, the LED element is used as an example of the light emitting element 28, but the disclosure is not limited thereto. As an example of the light emitting element 28, an organic electro-luminescence (EL) element may be used, and it is sufficient if any element that emits light is used.

Furthermore, in the embodiment, an example in which the "one surface" is the upper surface 42 of the board 40 has been described, but the disclosure is not limited thereto. Examples of the "one surface" may include a surface facing any of the lower side, the left side, the right side, the front side, and the rear side, and a direction in which the surface faces is not limited. A member on which the one surface is formed is not limited to the board 40, and it is sufficient if the member is any member on which the light source is disposed.

In addition, in the embodiment, an example in which the "first direction" is the front side has been described, but the disclosure is not limited thereto. Examples of the "first direction" may include any of the upper side, the lower side, the left side, the right side, and the rear side, and the first direction is not limited as long as the first direction is one direction along the one surface.

Furthermore, in the embodiment, an example in which the "second direction" is the left side has been described, but the disclosure is not limited thereto. Examples of the "second direction" may include any of the upper side, the lower side, the right side, the front side, and the rear side, and the second direction is not limited as long as the second direction is a direction along one surface and crossing the first direction.

In addition, in the embodiment, the first reflector 50 as an example of the first reflective portion has a function of reflecting light from the light emitting element 28 toward the front side, the rear side, the left side, and the right side, but the disclosure is not limited thereto. As an example of the first reflective portion, for example, the first reflective portion may reflect light from the light source toward the front side, the rear side, and the left side or reflect light from the light source toward the front side, the left side, and the right side, and it is sufficient if the first reflective portion reflects light from the light source at least toward the front side and the left side. Further, as an example of the first reflective portion, the shape, the material, and the like are not limited as long as the first reflective portion has a function of reflecting light from the light source at least toward the first direction and the second direction.

In the embodiment, the second reflector 60 as an example of the second reflective portion has the extending portion 61 and the facing portion 62, but the disclosure is not limited thereto. As an example of the second reflective portion, the shape, material, and the like are not limited as long as the second reflective portion has a function of reflecting light from the first reflective portion toward the first direction.

In the embodiment, the right end portion 63R of the reflective surface 63 of the second reflector 60 is disposed more toward the right side compared to the left end portion 50L of the first reflector 50 as shown in FIGS. 6 and 7, but the disclosure is not limited thereto. For example, the right end portion 63R of the reflective surface 63 may be disposed more toward the left side compared to the left end portion 50L of the first reflector 50.

In the embodiment, the right end portion 63R of the reflective surface 63 is disposed more toward the left side compared to the lower end portion 57D of the reflective surface 57, but the disclosure is not limited thereto. For example, the right end portion 63R of the reflective surface 63 may be disposed more toward the right side compared to the lower end portion 57D of the reflective surface 57.

In the embodiment, the reflective surface 64 of the second reflector 60 is disposed more toward the upper side compared to the upper end portion 57U of the reflective surface 57 of the first reflector 50, but the disclosure is not limited thereto. For example, the reflective surface 64 of the second reflector 60 may be disposed more toward the lower side compared to the upper end portion 57U of the reflective surface 57 of the first reflector 50.

In the embodiment, the curvature of the reflective surface 63 of the second reflector 60 decreases toward the left side as shown in FIGS. 8 and 13, but the disclosure is not limited thereto. For example, as indicated by a line with alternating long and two short dashes in FIG. 13, the curvature of the reflective surface 63 may increase toward the left side.

In the embodiment, the reflective surface 64 and the left end portion 63L of the reflective surface 63 form the angular corner portion 67, but the disclosure is not limited thereto. For example, the corner portion 67 formed by the reflective surface 64 and the left end portion 63L of the reflective surface 63 may be rounded as shown in FIG. 14.

In the embodiment, the front end portion 50F of the first reflector 50 is disposed more toward the front side compared to the front end portion 13F at the upper edge of the projecting portion 13, but the disclosure is not limited thereto. For example, the front end portion 50F of the first reflector 50 may be disposed more toward the rear side compared to the front end portion 13F at the upper edge of the projecting portion 13.

In the embodiment, the front end portions (that is, the front end portion 62F of the facing portion 62 and the front end portion 61F of the extending portion 61) of the second reflector 60 are disposed at an identical position to that of the front end portion 13F at the upper edge of the projecting portion 13 in the front-rear direction, but the disclosure is not limited thereto. For example, the front end portion of the second reflector 60 may be disposed more toward the rear side compared to the front end portion 13F at the upper edge of the projecting portion 13. Alternatively, the front end portion of the second reflector 60 may be disposed more toward the front side compared to the front end portion 13F at the upper edge of the projecting portion 13.

In the embodiment, the lighting device 20 functions as a display device showing the operation state of the image forming device 10, but the disclosure is not limited thereto. The lighting device 20 may be intended exclusively for illuminating the surroundings of the image forming device 10, and the application of the lighting device 20 is not limited.

In the embodiment, the image forming device 10 is used as an example of the mounting device, but the disclosure is not limited thereto. Examples of the mounting device may include a manufacturing device that manufactures various products, and various devices can be used.

Aspects of the technology of the disclosure will be described below.

A first aspect includes: a light source that is disposed on one surface; a first reflective portion that reflects light from the light source toward a first direction that is one direction along the one surface and a second direction that is along the one surface and orthogonal to the first direction; and a second reflective portion that is disposed on a side of the first reflective portion in the second direction and reflects light from the first reflective portion toward the first direction.

In a second aspect according to the first aspect, the second reflective portion includes a reflective surface facing the first direction, and a first end portion facing a direction opposite to the second direction in the reflective surface is disposed more toward the opposite direction compared to a second end portion of the first reflective portion, the second end portion facing the second direction.

In a third aspect according to the second aspect, the first reflective portion includes a reflective surface inclined toward the second direction while extending away from the one surface in a separation direction that crosses the one surface, as viewed in a direction opposite to the first direction, and the first end portion is disposed further toward the second direction compared to an end portion of the reflective surface of the first reflective portion, the end portion facing the one surface.

In a fourth aspect according to any one of the first to third aspects, the first reflective portion includes a first reflective surface inclined toward the second direction while extending away from the one surface in a separation direction that crosses the one surface as viewed in a direction opposite to the first direction, the second reflective portion includes a second reflective surface facing a direction opposite to the separation direction, and the second reflective surface is disposed more toward the separation direction compared to an end portion of the first reflective surface, the end portion facing the separation direction.

In a fifth aspect according to any one of the first to fourth aspects, the second reflective portion includes a reflective surface that faces the first direction and is concavely curved in the first direction, and a curvature of the reflective surface decreases toward the second direction.

In a sixth aspect according to any one of the first to fifth aspects, in the second reflective portion, an angular corner portion is formed by a reflective surface facing away from the one surface in a direction opposite to a separation direction that crosses the one surface, and a reflective surface extending in the opposite direction from an end portion of the reflective surface in the second direction, as viewed in a direction opposite to the first direction.

In a seventh aspect according to any one of the first to sixth aspects, the second reflective portion reflects, toward the first direction, a part of light reflected from the first reflective portion toward the second direction, and allows another part of the light to pass toward the second direction.

In an eighth aspect according to any one of the first to seventh aspects, the first reflective portion reflects light from a plurality of light sources toward at least one of a direction opposite to the first direction or a direction opposite to the second direction, and the second reflective portion allows the light reflected toward the at least one direction to be emitted to the outside of the lighting device.

A ninth aspect includes: the lighting device according to any one of the first to eighth aspects; and a mounting body at which the lighting device is mounted and which includes an arrangement portion disposed on a side of the lighting device in the second direction, in which an end portion of the first reflective portion of the lighting device in the first direction is disposed more toward the first direction compared to an end portion of the arrangement portion in the first direction.

In a tenth aspect according to the ninth aspect, an end portion of the second reflective portion of the lighting device in the first direction is disposed at an identical position to that of the end portion of the arrangement portion in the first direction or is disposed more toward a direction opposite to the first direction compared to the end portion of the arrangement portion in the first direction.

An eleventh aspect is a mounting device on which the lighting device according to any one of the first to eighth aspects is mounted, in which an illumination state of the lighting device is changed according to an operation state of the mounting device.

A twelfth aspect according to the eleventh aspect includes: an image forming unit that forms an image on a recording medium, in which the illumination state of the lighting device is changed between an execution state in which the image forming unit is executing an image forming operation and a stop state in which the image forming unit abnormally stops.

According to the configuration of the first aspect, it is possible to lengthen a region illuminated with light directed in the first direction along the second direction as compared with a configuration including only one reflective portion (that is, the first reflective portion).

According to the configuration of the second aspect, it is possible to suppress a decrease in light quantity at a boundary portion between a region illuminated with reflected light from the first reflective portion and a region illuminated with reflected light from the second reflective portion as compared with a configuration in which the first end portion is disposed more toward the second direction compared to the second end portion.

According to the configuration of the third aspect, it is possible to suppress an excessive increase in light quantity at a portion where the region illuminated with the reflected light from the first reflective portion and the region illuminated with the reflected light from the second reflective portion overlap each other as compared with a configuration in which the first end portion is disposed more toward the direction opposite to the second direction compared to the end portion of the reflective surface of the first reflective portion, the end portion facing the one surface.

According to the configuration of the fourth aspect, it is possible to suppress a decrease in light quantity at the end portion in the separation direction in the illumination region of the lighting device as compared with a configuration in which the second reflective surface is disposed more toward the direction opposite to the separation direction compared to the end portion of the first reflective surface, the end portion facing the separation direction.

According to the configuration of the fifth aspect, it is possible to suppress a decrease in light quantity at the boundary portion between the region illuminated with the reflected light from the first reflective portion and the region illuminated with the reflected light from the second reflective portion as compared with a configuration in which the curvature of the reflective surface increases toward the second direction.

According to the configuration of the sixth aspect, it is possible to suppress a decrease in light quantity at the corner portion of the illumination region as compared with a configuration in which the corner portion is rounded.

According to the configuration of the seventh aspect, it is possible to illuminate a side of the lighting device in the second direction.

According to the configuration of the eighth aspect, it is possible to illuminate at least one of the direction opposite to the first direction or the direction opposite to the second direction in the lighting device.

According to the configuration of the ninth aspect, it is possible to suppress blocking of light radiated from the lighting device toward the second direction as compared with a configuration in which the end portion of the first reflective portion in the first direction is disposed more toward the direction opposite to the first direction compared to the end portion of the arrangement portion in the first direction.

According to the configuration of the tenth aspect, it is possible to increase the amount of light illuminating the second direction side of the mounting device as compared with a configuration in which the end portion of the second reflective portion in the first direction is disposed more toward the first direction compared to the end portion of the arrangement portion in the first direction.

According to the configuration of the eleventh aspect, it is possible to grasp the operation state of the mounting device by confirming the illumination state of the lighting device.

According to the configuration of the twelfth aspect, it is possible to grasp whether the image forming device is in the execution state or the stop state by confirming the illumination state of the lighting device.

The invention is not limited to the above embodiment, and various modifications, changes, and improvements can be made without departing from the gist of the invention. For example, a plurality of modifications described above may be combined if appropriate.

The disclosure of Japanese Patent Application No. 2021-060620 filed on Mar. 31, 2021 is incorporated herein by reference in its entirety. All documents, patent applications, and technical standards mentioned herein are incorporated herein by reference to the same extent as if each individual document, patent application, and technical standard were specifically and individually stated.

The invention claimed is:

1. A lighting device, comprising:
a light source that is disposed on one surface;
a first reflective portion that reflects light from the light source toward a first direction that is one direction along the one surface and a second direction that is along the one surface and orthogonal to the first direction; and
a second reflective portion that is disposed on a side of the first reflective portion in the second direction and reflects light from the first reflective portion toward the first direction,
wherein the second reflective portion comprises a reflective surface facing the first direction, and a first end portion facing a direction opposite to the second direction in the reflective surface is disposed more toward the opposite direction compared to a second end portion of the first reflective portion, the second end portion facing the second direction,
wherein the first reflective portion comprises a reflective surface inclined toward the second direction while extending away from the one surface in a separation direction that crosses the one surface, as viewed in a direction opposite to the first direction, and
wherein the first end portion is disposed further toward the second direction compared to an end portion of the reflective surface of the first reflective portion, the end portion facing the one surface.

2. A lighting device, comprising:
a light source that is disposed on one surface;
a first reflective portion that reflects light from the light source toward a first direction that is one direction along the one surface and a second direction that is along the one surface and orthogonal to the first direction; and
a second reflective portion that is disposed on a side of the first reflective portion in the second direction and reflects light from the first reflective portion toward the first direction,
wherein the first reflective portion comprises a first reflective surface inclined toward the second direction while extending away from the one surface in a separation direction that crosses the one surface as viewed in a direction opposite to the first direction,
wherein the second reflective portion comprises a second reflective surface facing a direction opposite to the separation direction, and
wherein the second reflective surface is disposed more toward the separation direction compared to an end portion of the first reflective surface, the end portion facing the separation direction.

3. A lighting device, comprising:
a light source that is disposed on one surface;
a first reflective portion that reflects light from the light source toward a first direction that is one direction along the one surface and a second direction that is along the one surface and orthogonal to the first direction; and
a second reflective portion that is disposed on a side of the first reflective portion in the second direction and reflects light from the first reflective portion toward the first direction,
wherein, in the second reflective portion, an angular corner portion is formed by a reflective surface facing away from the one surface in a direction opposite to a separation direction that crosses the one surface, and a reflective surface extending in the opposite direction from an end portion of the reflective surface in the second direction, as viewed in a direction opposite to the first direction.

4. A mounting device, comprising:
a lighting device comprising:
a light source that is disposed on one surface,
a first reflective portion that reflects light from the light source toward a first direction that is one direction along the one surface and a second direction that is along the one surface and orthogonal to the first direction, and
a second reflective portion that is disposed on a side of the first reflective portion in the second direction and reflects light from the first reflective portion toward the first direction; and
a mounting body at which the lighting device is mounted and which comprises an arrangement portion disposed on a side of the lighting device in the second direction,
wherein an end portion of the first reflective portion of the lighting device in the first direction is disposed more toward the first direction compared to an end portion of the arrangement portion in the first direction, and
wherein an end portion of the second reflective portion of the lighting device in the first direction is disposed at an identical position to that of the end portion of the arrangement portion in the first direction or is disposed more toward a direction opposite to the first direction compared to the end portion of the arrangement portion in the first direction.

* * * * *